Patented Nov. 22, 1938

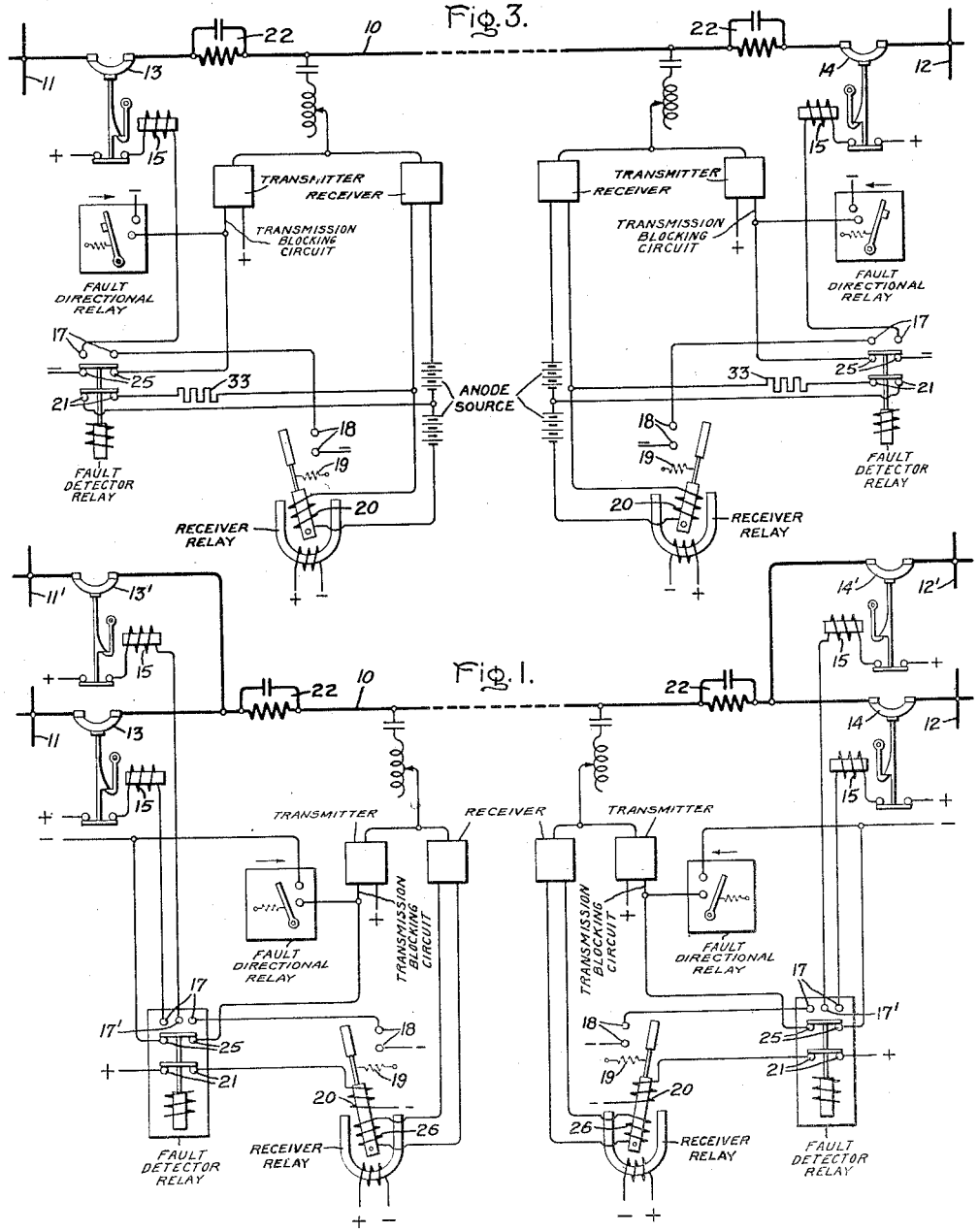

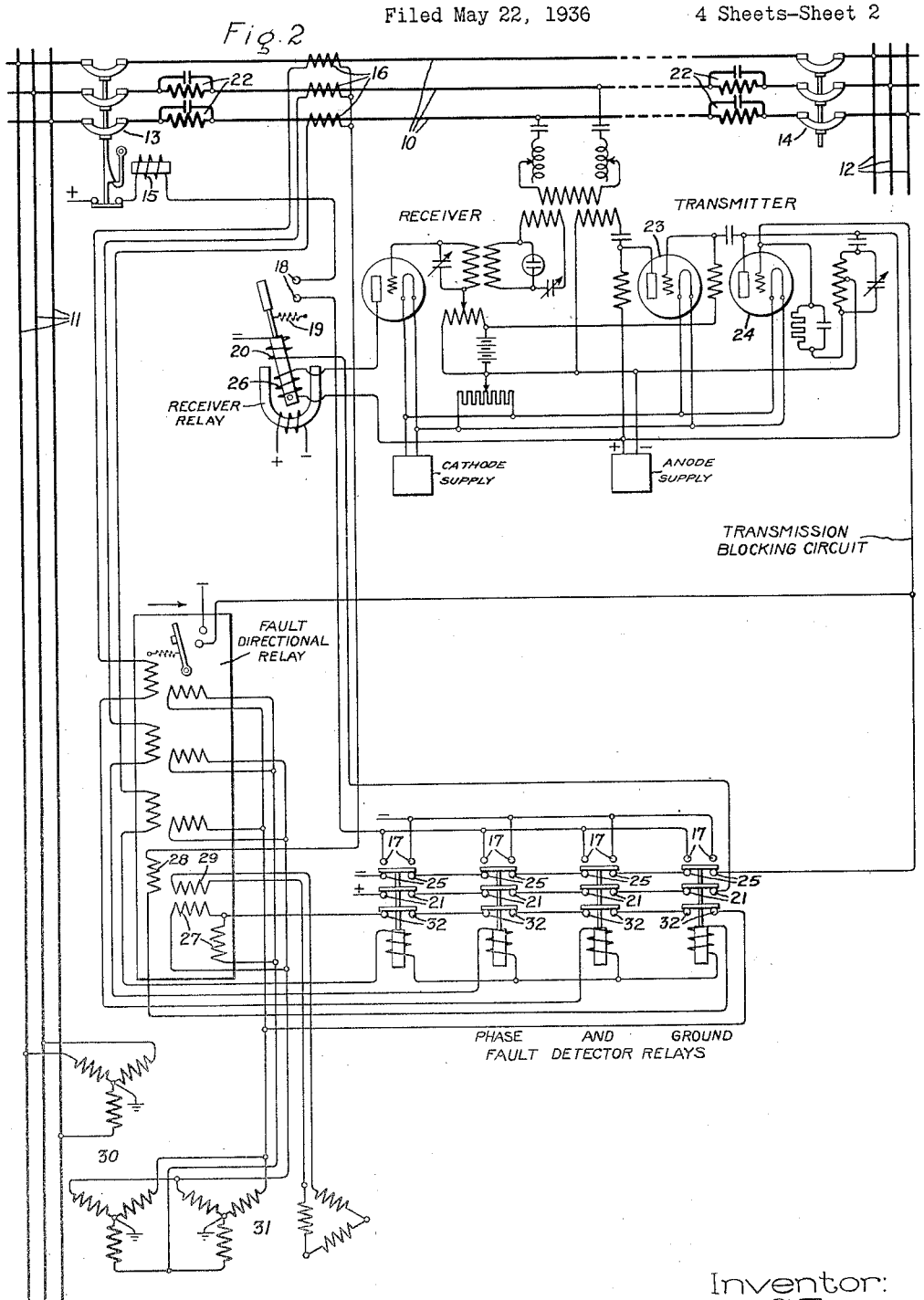

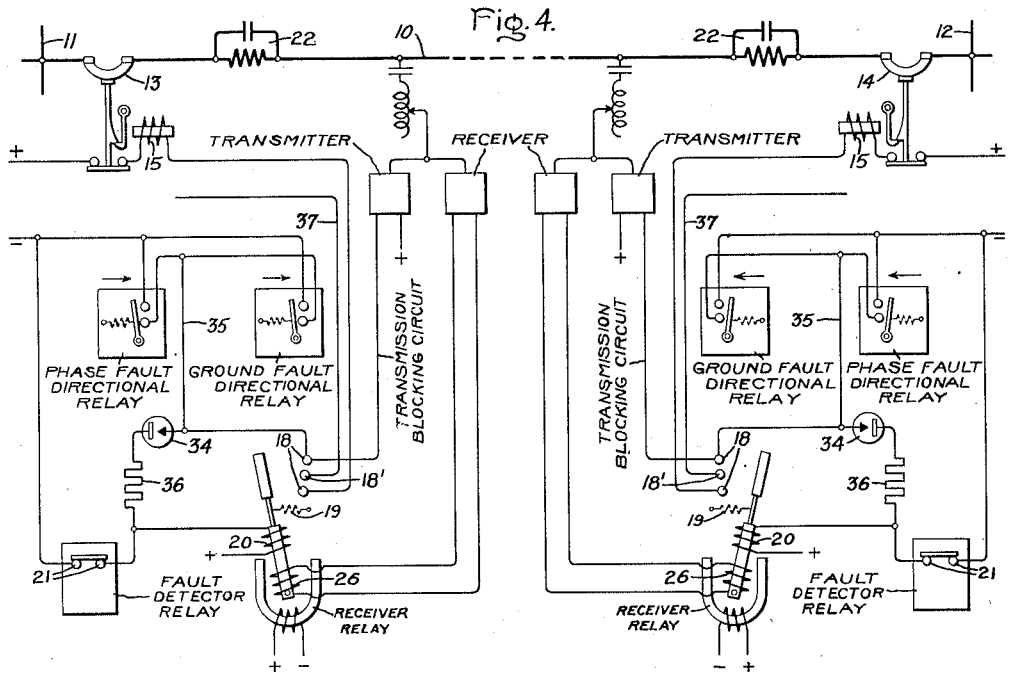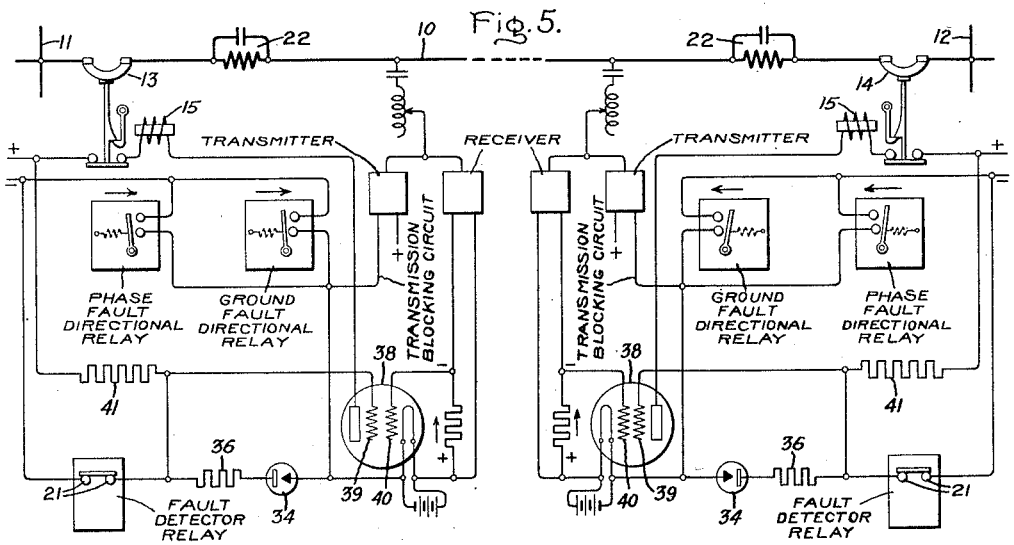

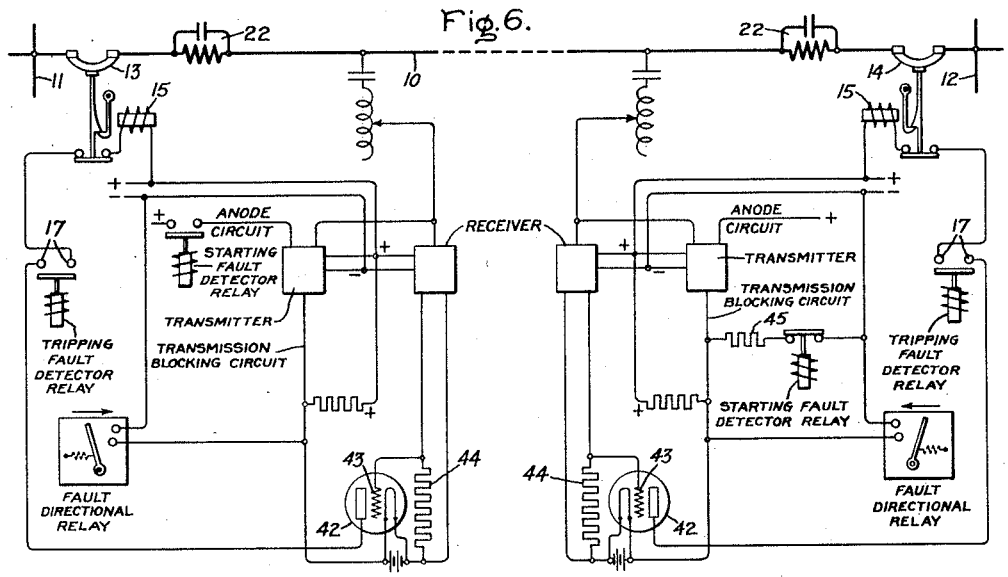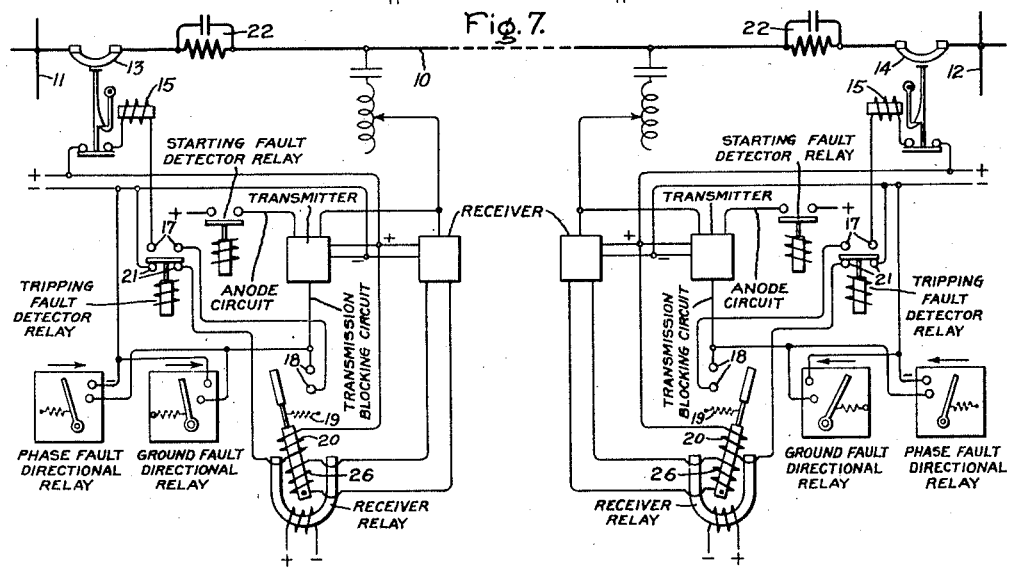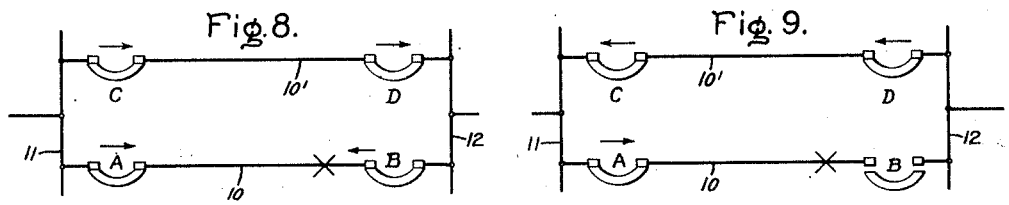

2,137,865

UNITED STATES PATENT OFFICE 2,137,865

PROTECTIVE ARRANGEMENT

Oliver C. Traver, Drexel Hill, Pa., assignor to General Electric Company, a corporation of New York Application May 22, 1936, Serial No. 81,283

22 Claims. (Cl. 175—294)

My invention relates to improvements in protective arrangements for electric power systems wherein any section of the system can be protected independently of the rest of the system, and more particularly to improvements in protective arrangements of the type, disclosed in United States Letters Patent No. 1,765,887, issued June 24, 1930 on an application filed by E. W. M. Scott and B. H. Leeson, wherein selective or discriminating action is obtained by an indirect comparison of corresponding electric quantities at two points of a system. One object of my invention is to provide an improved protective arrangement for isolating a system section so quickly upon the occurrence of a fault as practically to avoid appreciable disturbance to the system. Another object of my invention is to provide an improved protective arrangement such that a faulty section fed from only one end of the section can be quickly disconnected from the supply. A further object of my invention is to provide an improved protective arrangement whereby to prevent the false operation of circuit breakers on sound parts of a system whose configuration is such that the operation of one circuit breaker to clear a fault can cause an instantaneous power reversal in some other part of the system. These and other objects of my invention will appear in more detail hereinafter.

My invention will be better understood from the following description when considered in connection with the accompanying four sheets of drawings, and its scope will be pointed out in the appended claims.

In the accompanying drawings, Fig. 1 illustrates diagrammatically an embodiment of my invention shown in single phase diagram for simplicity; Fig. 2 illustrates diagrammatically the protective apparatus at one end of a three-phase line section in accordance with the embodiment of my invention shown in Fig. 1; Figs. 3, 4, 5, 6, and 7 illustrate diagrammatically other embodiments of my invention shown in single phase diagram for simplicity; and Figs. 8 and 9 are explanatory diagrams.

In the embodiment of my invention shown in Fig. 1, a section of an electric system or power line, illustrated schematically by current conducting means 10, extends between two stations shown as buses 11 and 12 through suitable circuit interrupting means such as latch closed circuit breakers 13 and 14 having trip coils 15. The current conducting means 10 is drawn partially in broken line to give a concept of distance. In some cases the line section may be arranged for connection through circuit breakers 13', 14', to a bus arrangement including further buses 11' and 12', not shown in Fig. 2.

For effecting the opening of the circuit breakers, I provide at each end of the section suitable fault responsive means such as fault detector relays. These may be of any suitable type, for example, over-current, impedance, undervoltage, etc., but, for the sake of simplicity, are shown in Fig. 2 as simple instantaneous overcurrent relays, one phase fault detector relay for each phase and a ground fault detector relay. These relays are connected to be energized in accordance with the different phase currents and the vector sum of such currents, respectively, to suitable means such as current transformers 16 in a manner well known to the art. Each of the fault detector relays is provided with circuit closing contacts 17 connected in series in the trip coil circuit but in parallel with each other. In case more than one circuit breaker is to be opened, as in Fig. 1, the fault detector relays may be provided with an additional contact 17' from which extends a lead to the trip coil 15 of the other associated circuit breaker. This arrangement makes it possible for one relay to trip a plurality of circuit breakers simultaneously from a single source and yet each breaker may be controlled from the same source by another manually or otherwise operated trip switch without at the same time tripping the other circuit breaker.

In order to prevent the opening of the circuit breaker except in case of internal faults, I provide means for keeping the trip coil circuit from being energized under normal circuit conditions and also on the occurrence of external faults; as shown in Figs. 1 and 2. The preventive means is a receiver relay, which is illustrated as of the polarized type. This relay is biased to close its contacts 18 by suitable means such as a spring 19, but is also normally biased predominantly in the opposite direction to keep its contacts open by means of a winding 20 whose energization is controlled in response to the presence or absence of a fault on the system. For this purpose, the winding 20 may have its circuit controlled by circuit opening contacts 21 on the fault detector relays so that response of any one of these relays at one end of the section will tend to effect the closing of the contacts 18 of the receiver relay. Since it merely requires the parting of the contacts 21 to release the receiver relay so that it can close its contacts 18, it will be observed that the closing of both the contacts 18 and 17 can be speedily accomplished.

For the contacts 18 to close on an internal fault is exactly what is desired because the tripping of the circuit breaker is thereby effected, since the fault detector relay also operates simultaneously to close its contacts 17 and thereby complete the circuit of the trip coil 15.

However, if the fault is external to the section of the line between the buses 11 and 12, the tripping of the circuit breaker must not occur, and in order to insure this, I provide means for maintaining a predominant bias on the receiving relay opposite in direction to the bias provided by the spring 19. As shown, this preventive bias is provided for the receiver relay at each end, initially by means at the end where the relay is located, and subsequently controlled by means at the end of the section where energy is flowing out. For this purpose there is provided at each end of the section means for transmitting a control current and means at each end responsive to the currents so transmitted. The particular means illustrated is an electric discharge valve oscillation transmitter and a receiver suitably coupled to the line 10, shown more in detail in Fig. 2. The transmitters and receivers may all be tuned to the same frequency, the line section conductors to which the transmitters and receivers are coupled being provided with suitable traps 22 to prevent external system short circuits from short circuiting the channel of the high frequency current protective gear. The transmitter may include suitable amplifying means such as the amplifier valve 23. Transmission is normally blocked, preferably by applying a suitable bias to the control electrode means of the master oscillator valve 24 through suitable fault-responsive means such as the circuit opening contacts 25 of the fault detector relays. The receiver relay may be provided with a further biasing winding 26 which is connected in the anode circuit of the receiver.

The receiver relay should of course remain blocked only if the fault is outside of the section. This can be determined by knowing the directions of power flow at both ends. Thus, if power flow is into the section from the left, a temporary block established by the transmitter at station 11 should last only long enough to find out whether power flow is into or out of the section at the other end. Accordingly, I provide a fault directional relay which is arranged on the occurrence of a fault with power flow into the section to stop transmission of control current at its end by applying a suitable biasing potential to the control electrode means of the master oscillator valve 24. Control of transmission by the fault directional relay means in this way is preferable to the control of the anode circuit for reasons which will be explained in more detail hereinafter.

While any suitable fault directional relay may be used, I have chosen to illustrate schematically in Fig. 2 an impedance type of polyphase power directional relay which has a voltage restraint element embodying two cooperating torque producing voltage windings 27, as disclosed in United States Letters Patent 1,883,839, issued August 18, 1932 on an application filed by R. L. Webb. In addition, the fault directional relay may include a ground power directional element embodying a current winding 28 and a voltage winding 29, respectively connected to be energized in accordance with the vector sum of the phase currents and the voltages to ground of the phase conductors. The current and voltage windings of the fault directional relay may be connected to be energized respectively from the current transformers 16 and potential transformers 30 and 31 in a manner well known to the art. To obtain preferential control in case of ground faults, the ground fault torque element may be so constructed as to have a predominant torque over the polyphase torque. In other words, the relay is more sensitive to ground fault power flow in one direction than to a simultaneously existing load power flow in the opposite direction. In order to have only power directional action in case of faults, the voltage restraining element may be controlled by the fault detector relays through circuit opening contacts 32 in such a way that the operation of any fault detector relay will deenergize the voltage restraint coils 27.

Assuming an external fault to the right of station 12, for example, and energy flow through the section 10 from the bus 11, then a fault detector relay at each station operates. The transmission blocking circuit is opened at each station through the contacts 25 of the fault detector relay so that each transmitter can transmit. Accordingly, each of the receiver relays has its winding 26 energized through the local receiver so that the opening of the circuit of the receiver relay winding 20 by the fault detector relay does not result in a circuit closing operation of its contacts 18. Very quickly thereafter, the fault directional relay at station 11 closes its contacts to reestablish the transmission blocking circuit. The direction of power flow is from this station to the section as indicated by the arrow over the relay. In each case, the arrow over the fault directional relay indicates the direction of power flow for which the relay closes its contacts. Transmission is accordingly stopped at station 11, but at station 12, the fault directional relay does not close its contacts and transmission continues from this station. Each receiver remains energized and in turn maintains the winding 26 of the associated receiver relay energized to hold its contacts 18 open and no tripping occurs.

If, however, the fault were internal, then following the initial very brief transmission, both of the fault directional relays will close their contacts, thereby energizing both transmission blocking circuits. Accordingly, all transmission is stopped and the energization of the winding 26 of each receiver relay ceases. This results in the opening of the circuit breaker at each end due to the closing of the receiver relay contacts 18, under the action of spring 19, and to the fact that the tripping contacts 17 of the fault detector relay are already closed. This results in the opening of the circuit breaker at each station. If the structure of the system is such that no energy can be supplied from station 12 into the section, for example, then the transmitter at station 12 remains blocked because the fault detector relay does not respond. Consequently, no transmission beyond the initial amount at station 11 between the opening of the fault detector relay contacts 25 and the closing of the fault directional relay contacts can occur, and the circuit breaker at station 11 is tripped. It will be obvious that the operations herein set forth are just the same if power flow is from right to left, except that the order of events at the two stations will be interchanged insofar as operation is dependent on the direction of flow of power.

The embodiment of my invention shown in Fig. 3 is essentially the same as that shown in Figs. 1 and 2, except that I have illustrated the receiver relay as having a single winding 20 which is normally energized across a portion of the anode source through the circuit opening contacts 21 of the fault detector relay. In order to limit the current in the winding 20, a resistance 33 may be used. Thus, regardless of whether the winding 20 of the receiver relay is in a circuit across a part of the anode source and through the contacts 21 or in the receiver anode circuit, its energization can be maintained at the right value. The operation of this embodiment of my invention will be apparent from what has preceded.

The embodiment of my invention shown in Fig. 4 differs from that shown in Fig. 1 in that a single set of contacts 21 on the fault detector relay controls the receiver relay winding 20 and turns on the local transmitter. To prevent the fault directional relays, shown as separate phase and ground fault directional relays, from reenergizing the receiver relay when the fault directional relay turns off the transmitter, I connect suitable valve means, such as a rectifier 34, between that one of the contacts 21 to which the winding 20 is connected and the grid of the master oscillator valve of the transmitter, and further connect the common lead 35 from the fault directional relay contacts between the rectifier 34 and the grid. In this embodiment of my invention, the trip circuit includes the contacts of the directional relays in parallel with each other, each in series with the contacts 18 of the receiver relay.

In order to prevent any possibility of tripping the circuit breaker through the contacts 21 of the fault detector relay and the contacts 18 of the receiver relay, a suitable resistance 36 may be included in series with the rectifier 34, as shown. The value of this resistance is such as not to pass enough current to trip the circuit breaker. An additional contact 18' may be provided on the receiver relay to which a lead 37 may be run to another trip coil, where more than one circuit breaker is to be operated, as explained in connection with the contacts 17' of the fault detector relay in Fig. 1. The operation of this embodiment of my invention will be apparent from the foregoing in connection with the description of Figs. 1 and 2.

In order to obtain faster tripping operation, I may use as a receiver relay means suitable electric discharge valve means, such as the double grid valve 38 shown in Fig. 5. The trip circuit is in reality the anode circuit of this valve and includes in series in the anode circuit the trip coil 15 and the contacts of the phase or the ground fault directional relays, the contacts of the latter relays being in parallel with each other. Normally, the valve 38 is maintained nonconductive by a suitable bias on one of its grids 39 through the contacts 21 of the fault detector relay which also biases the transmitter as in Fig. 4. In case of faults, the valve 38 is maintained nonconductive by a suitable bias on its other grid 40 derived from the local receiver, except in case of internal faults when the valve becomes conductive to energize the trip coil. In order to prevent a short circuit of the tripping source through the normally closed contacts 21 of the fault detector relay, a suitable resistance 41 is connected as shown. The operation of this embodiment of my invention is similar to that of the protective arrangement shown in Fig. 4, except that higher speed of fault clearing is possible. If two circuit breakers are to be controlled with the arrangement shown in Fig. 5, then two valves 38 at each station may be used with their anode circuits for the respective circuit breakers and all other elements in parallel.

The advantages of all grid control of the transmitters in the protective arrangements illustrated will be apparent from the following consideration of Figs. 8 and 9. It will be assumed that the system section includes two parallel portions or lines 10 and 10' or the equivalent thereof, each of which is provided with a protective arrangement such as shown in the arrangements heretofore described. It will be further assumed that a fault occurs as indicated at X, and that initially the directions of power flow are as indicated by the arrows in Fig. 8. Consequently, the fault directional relays at A, B, and C apply a biasing potential to the control electrodes of the master oscillator valve of the transmitter at each of these points, and no transmission occurs at these three points beyond the first brief period between the opening of the fault detector contacts and the closing of the fault directional relay contacts. Therefore, the circuit breakers at A and B will be tripped, but the circuit breaker at B may open first. Transmission is in progress at D, since the contacts of the fault directional relay at D are open. Tripping is accordingly blocked at C and D. Immediately following the opening of the circuit breaker B, a reversal of power flow occurs at D and C, as shown in Fig. 9, if power is available from the right because the fault is still being fed through the circuit breaker at A. If transmission were stopped at D before it is started at C, it is most probable that the circuit breakers at these points will be tripped falsely. However, since the fault directional relay at D has had its contacts open and requires time to close to block transmission whereas the fault directional relay at C has its contacts closed and does not require so much time to open to start transmission, no interval without transmission will occur due to the slower opening of the circuit breaker at A because it will require a longer time for the fault directional relay at D to close its contacts than it will for the corresponding relay at C to open its contacts. Consequently, transmission is not stopped on the line 10' until such time as the fault is cleared by the opening of the circuit breaker A and the fault detectors have reset. This overlap in transmission of blocking current at two stations on a sound section does not occur in protective systems wherein the plate circuit is closed to start transmission and opened to stop transmission, since in this case there can occur an interval during which there is no transmission and false tripping may occur in this interval.

In the embodiment of my invention illustrated in Fig. 6, the trip circuit, like the arrangement shown in Fig. 5, is in reality the anode circuit of an electric discharge valve 42 having the control electrode 43, which is energized by the receiver through a grid resistance 44 to block tripping under certain fault conditions; that is, unless the fault is inside the section. As shown, the trip circuit includes the circuit closing contacts of a tripping fault detector relay and the contacts of a fault directional relay which may combine both phase and ground fault response as the directional relay of Fig. 2. Of course, in any of the illustrated embodiments of my invention showing phase fault and ground fault directional relays, these relays may be combined in a single relay as shown in Fig. 2. Further, I add a starting fault detector relay for controlling the transmitter. This relay may have circuit closing contacts for controlling the anode circuit of the transmitter directly, as shown on the left side of Fig. 6, or circuit opening contacts to control the transmission blocking circuit, as shown on the right side of Fig. 6, with a suitable resistance 45 in the grid circuit of the master oscillator valve. Since the valve 42 is normally conductive, it must be rendered nonconductive before the tripping fault detector relay and either of the fault directional relays can close their contacts. This can be done by having the starting fault detector relay faster in action than the slower one of the tripping fault detector or fault directional relays.

In case of a fault, transmission is started almost instantaneously by the starting fault detector relay which should have the quickest possible contact action. Accordingly, the receivers at each end are energized and the valve 42 rendered initially nonconductive. If the fault is a through fault, then the fault directional relay at one station, depending upon the direction of power flow in the station, will remain open, and transmission will continue from this one station, thereby holding the valve 42 at each station nonconductive and thus preventing tripping at the other station where the fault directional relay operates to close its contacts. In case of an internal fault, all transmission is blocked and one or both ends will be tripped, depending on whether power can flow into only one end or into both ends of the section.

The embodiment of my invention shown in Fig. 7 is analogous to the arrangement shown in Fig. 6, in that both tripping and starting fault detector relays are provided, the starting fault detector relay again controlling the anode circuit of the transmitter. Instead of the electric discharge valve receiver controlled means, I provide a two-coil receiver relay whose windings 20 and 26 are controlled in the same manner as in the arrangement shown in Fig. 1. Both phase and ground fault directional relays may be used as shown or a single directional relay containing both features, as pointed out in connection with the description of Fig. 2.

While in all cases I have illustrated the control currents as transmitted over the system phase conductors in the form of carrier currents, it will be understood by those skilled in the art to which my invention pertains that any suitable means of communication between the relays at the ends of a line may be employed, as, for example, an auxiliary circuit, space transmission, and the like. The control currents may also be of any suitable frequencies and even direct current can be used.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States is:

1. A protective arrangement for an electric power circuit including circuit interrupting means at one end of a section of the power circuit, a control circuit for effecting the opening of said circuit interrupting means, means for effecting the energization of said control circuit including a fault-responsive relay connected to be energized from the power circuit, means biased under normal conditions of the power circuit to prevent the energization of said control circuit, means tending to remove said bias on the occurrence of a fault on the power circuit, and means for maintaining said bias if the fault is outside of said circuit section including an oscillation transmitter at the other end of said circuit section having a master oscillator electric discharge valve, and means for applying a positive potential to the anode of said valve only on the occurrence of a fault, and a receiver at said one end tuned to the frequency of said transmitter.

2. A protective arrangement for an electric circuit including circuit interrupting means at one end of a section of the circuit, means for effecting the opening of said circuit interrupting means including fault-responsive means connected to be energized from the circuit, means for preventing the opening of the circuit interrupting means under predetermined circuit conditions, means tending to eliminate the preventive action of said preventing means on the occurrence of a fault on the circuit, and means for maintaining the preventive action of said preventing means if the fault is outside of said circuit section including an oscillation transmitter at the other end of said section having a master oscillator electric discharge valve provided with a control electrode means, a receiver at said one end tuned to the frequency of said transmitter, means at said other end for normally applying to the control electrode means of said valve a potential such as to prevent the operation of the transmitter including fault-responsive means connected to be energized from the power circuit operative on the occurrence of a fault on the circuit to remove said potential whereby to permit said transmitter to transmit to said receiver, and directional relay means for restoring said potential during the existence of the fault when energy flow at said other end is into said circuit section.

3. A protective arrangement for an electric power circuit including circuit interrupting means at one end of a section of the power circuit, a control circuit for effecting the opening of said circuit interrupting means, means for effecting the energization of said control circuit including a fault-responsive relay connected to be energized from the power circuit, means biased under normal conditions of the power circuit to prevent the energization of said control circuit, means tending to remove said bias on the occurrence of a fault on the power circuit, and means for maintaining said bias if the fault is outside of said circuit section including an oscillation transmitter at the other end of said circuit section having a master oscillator electric discharge valve with a control electrode and an anode whose potential is continuously positive, a receiver at said one end tuned to the frequency of said transmitter, fault-responsive means at said other end connected to be energized from the power circuit for normally applying a blocking potential to the control electrode of said valve whereby normally to prevent the operation of said transmitter operative on the occurrence of a fault on the circuit to remove said bias whereby to permit said transmitter to transmit to said receiver, and directional relay means for restoring said control electrode bias during the existence of the fault when energy flow at said other end is into said circuit section.

4. A protective arrangement for an electric circuit including circuit interrupting means at one end of a section of the circuit, means for controlling the opening of said circuit interrupting means including fault-responsive means connected to be energized from the circuit and electric discharge valve means, means for rendering said valve means nonconducting for a time after the occurrence of a fault on said circuit, and means for rendering said valve means conducting after the expiration of said time unless the fault is outside the circuit section.

5. A protective arrangement for an electric circuit including circuit interrupting means at one end of a section of the circuit, means for controlling the opening of said circuit interrupting means including fault-responsive means connected to be energized from the circuit and normally nonconducting electric discharge valve means, means for maintaining said valve means nonconducting for a time after the occurrence of a fault on said circuit, and means for rendering said valve means conducting after the expiration of said time unless the fault is outside the circuit section.

6. A protective arrangement for an electric circuit including circuit interrupting means at one end of a section of the circuit, means for controlling the opening of said circuit interrupting means including fault-responsive means connected to be energized from the circuit and electric discharge valve means, means for rendering said valve means nonconducting for a time after the occurrence of a fault on said circuit, and means including a single power directional relay responsive to both phase and ground faults for rendering said valve means conducting at the expiration of said time unless the fault is outside the circuit section.

7. A protective arrangement for an electric circuit including circuit interrupting means at one end of a section of the circuit, means for controlling the opening of said circuit interrupting means including fault-responsive means connected to be energized from the circuit and an electric discharge valve means, means for maintaining said valve means nonconducting under normal conditions of the circuit including means operative to maintain the valve means temporarily nonconducting on the occurrence of a fault on the circuit with energy flow into the section at said one end, and means for further maintaining said valve means nonconducting for said direction of energy flow if the fault is outside of said circuit section including means at the other end of the section for transmitting current to said one end when the direction of energy flow in the circuit is from the section to said other end and means at said one end responsive to said transmitted current.

8. A protective arrangement for an electric power circuit including circuit interrupting means at one end of a section of the power circuit, means for controlling the opening of said circuit interrupting means including an electric discharge valve means, power directional fault-responsive means for controlling the energization of the anode circuit of said valve means connected to be energized from said power circuit and operative under normal circuit conditions to prevent the energization of said anode circuit and under abnormal circuit conditions with energy flow into the section from said end to tend to energize the anode circuit, means for rendering said valve means nonconductive on the occurrence of a fault on the power circuit until said power directional fault-responsive means has operated including a second fault-responsive means connected to be energized from the power circuit and means at the other end of said section for transmitting a current to said one end if the direction of energy flow in the circuit is from the section to said other end, and means energized by said transmitted current for maintaining the valve means at said one end nonconductive while the faulty condition prevails.

9. A protective arrangement for an electric circuit including circuit interrupting means at one end of a section of the circuit, means for controlling the opening of said circuit interrupting means including fault-responsive means connected to be energized from the circuit and an electric discharge valve having two control electrodes, means for applying to one of said control electrodes a potential for rendering the valve nonconducting under normal conditions of the circuit operative to remove said potential on the occurrence of a fault on the circuit whereby to tend to render said valve conductive, and means for maintaining said valve nonconducting if the fault is outside of said circuit section, including means at the other end of the section for transmitting a current to said one end when the direction of energy flow in the circuit is from the section to said other end and means at said one end for applying to the other control electrodes of said valve a potential for maintaining the valve nonconducting including means responsive to said transmitted current.

10. A protective arrangement for an electric circuit including circuit interrupting means at one end of a section of the circuit, means for controlling the opening of said circuit interrupting means including fault-responsive means connected to be energized from the circuit and an electric discharge valve means, means for maintaining said valve means nonconducting under normal conditions of the circuit operative to maintain the valve means nonconducting for a time after the occurrence of a fault on the circuit and means for further maintaining said valve means nonconducting if the fault is outside of said circuit section including means at each end of the section for transmitting current to said one end when the direction of power flow in the circuit is out of the section at either end and means at said one end responsive to said transmitted current.

11. A protective arrangement for an electric power circuit including circuit interrupting means at one end of a section of the power circuit, means for controlling the opening of said circuit interrupting means including electric discharge valve means, a first fault-responsive means for controlling the energization of the anode circuit of said valve means connected to be energized from said power circuit and operative under normal circuit conditions to prevent the energization of said anode circuit and under abnormal conditions to tend to effect the energization of said anode circuit, means including a second fault-responsive means connected to be energized from the power circuit for rendering said valve means nonconductive on the occurrence of a fault on the power circuit until said first fault-responsive means has operated, and means for maintaining said valve means nonconductive when there is a flow of power out of the other end of the circuit section.

12. A protective arrangement for an electric circuit including circuit interrupting means at one end of a section of the circuit, means for controlling the opening of said circuit interrupting means including fault-responsive means connected to be energized from the circuit and an electric discharge valve having control electrode means, means for applying to said control electrode means a potential for rendering the valve nonconductive under normal conditions of the circuit operative to remove said potential on the occurrence of a fault on the circuit whereby to tend to render said valve conductive and means for maintaining said valve nonconductive if the fault is outside of said circuit section including means at the other end of the section for transmitting a current to said one end when the direction of energy flow in the circuit is from the section to said other end, and means at said one end for applying to said control electrode means a potential for rendering the valve nonconductive including means responsive to said transmitted current.

13. A protective arrangement for an electric circuit including circuit interrupting means, means for controlling the opening of said circuit interrupting means including receiver relay means, means for rendering said receiver relay means normally ineffective in the opening of said circuit interrupting means and means for maintaining said receiver relay means ineffective under predetermined circuit conditions, including means for transmitting a control current for controlling said receiver relay means and means for controlling said transmitting means and said receiver relay means including a rectifying means and a fault detector relay means connected to be energized from the circuit and having a single contact means controlling a circuit to said receiver relay means and a circuit to said transmitting means through said rectifying means.

14. A protective arrangement for an electric circuit including circuit interrupting means at one end of a section of the circuit, means for controlling the opening of said circuit interrupting means including electric discharge valve means, fault responsive means for normally rendering said discharge valve means nonconducting including fault detector relay means and fault-directional relay means operative to complete contact controlling operations at different times and tending to render said valve means conducting on the occurrence of a fault with power flow into the section at said one end, and means for maintaining said valve means nonconducting during the time between the operations of said relays when power flow is into the section at said one end, and means for rendering said valve means conducting at the expiration of said time unless the fault is outside the circuit section.

15. A protective arrangement for an electric circuit including circuit interrupting means at one end of a section of the circuit, means for effecting the opening of said circuit interrupting means including fault-responsive means connected to be energized from the circuit, means biased under normal conditions of the circuit to prevent the opening of said circuit interrupting means and means for maintaining the bias on said preventing means on the occurrence of a fault on the circuit with power flow out of the section at said one end including means at said one end for transmitting a control current, a circuit closing directional relay means for stopping the transmission of said control current on the occurrence of power flow into the section at said one end, and means for maintaining the biasing action on said preventing means when power flow is out of the section at the other end, including means at said other end for transmitting a control current, and means for controlling said transmitting means including directional relay means connected to be energized from the circuit and operative to effect transmission at said other end when its contacts are opened.

16. A protective arrangement for an electric circuit including circuit interrupting means at one end of a section of the circuit, means for controlling the opening of said circuit interrupting means including fault-responsive means connected to be energized from the circuit and an electric discharge valve means, means for rendering said valve means nonconducting under normal conditions of the circuit, means operative to maintain the valve means nonconducting for a time after the occurrence of a fault on the circuit with power flow into the section at said one end, and means for rendering said valve means conducting at the expiration of said time unless the fault is outside the circuit section.

17. A protective arrangement for an electric circuit including circuit interrupting means at one end of a section of the circuit, means for effecting the opening of said circuit interrupting means including fault-responsive means connected to be energized from the circuit, means biased under normal conditions of the circuit to prevent the opening of said circuit interrupting means and means for maintaining the bias on said preventing means on the occurrence of a fault on the circuit with power flow out of the section at said one end including means at said one end for transmitting a control current, and a circuit closing directional relay means for stopping the transmission of said control current on the occurrence of power flow into the section at said one end.

18. In combination, a polyphase alternating current circuit and circuit interrupting means therefor, means for controlling said circuit interrupting means including a channel of communication between two points of the circuit, means for controlling said channel of communication including at each of said points a combined power directional and ground fault responsive relay connected to be energized from the circuit to have a preferential ground fault response, and means controlled by said relays for selectively controlling the energization of said channel of communication in accordance with the location of a fault within or without the section of the circuit between said points.

19. In combination, an electric circuit and circuit interrupting means therefor, means for controlling said circuit interrupting means including a channel of communication between two points of the circuit, means for controlling said channel of communication including at each of said points a power directional relay responsive to both phase and ground faults and connected to be energized from the circuit, said relay being more sensitive to ground fault power flow in one direction than to the simultaneously existing load power flow in the opposite direction, and means controlled by said relays for selectively controlling the energization of said channel of communication in accordance with the location of a fault within or without the section of the circuit between said points.

20. A protective arrangement for an electric circuit including circuit interrupting means at one end of a section of the circuit, means for controlling the opening of said circuit interrupting means including a trip circuit, an electric discharge valve means having its output circuit in series relation in said trip circuit, and means including fault responsive relay means at both ends of the circuit section connected to be energized from the circuit for rendering said valve means effective to energize said trip circuit only on the occurrence of a fault within said circuit section.

21. A protective arrangement for an electric circuit including circuit interrupting means at one end of a section of the circuit, means for controlling the opening of said circuit interrupting means including fault-responsive means connected to be energized from the circuit and normally nonconducting electric discharge valve means, and means at both ends of the circuit section including fault responsive relay means connected to be energized from the circuit for rendering said valve means conducting only on the occurrence of a fault on said circuit within the circuit section.

22. A protective arrangement for an electric circuit including circuit interrupting means, means for controlling the opening of said circuit interrupting means including receiver relay means, means for rendering said receiver relay means normally ineffective in the opening of said circuit interrupting means and means for maintaining said receiver relay means ineffective under predeteremined circuit conditions including means for transmitting a control current for controlling said receiver relay means, and means for controlling said transmitting means and said receiver relay means including a fault detector relay connected to be energized from the circuit and having a single contact means controlling a circuit to said receiver relay means and a circuit to said transmitting means and a valve means in the circuit to said transmitting means.

OLIVER C. TRAVER.